United States Patent [19]
Burdick et al.

[11] 3,897,774
[45] Aug. 5, 1975

[54] SIGNAL PROCESSING CIRCUIT

[75] Inventors: Thomas H. Burdick, Deerfield; Richard A. Johnson, Round Lake, both of Ill.

[73] Assignee: Baxter Laboratories, Inc., Morton Grove, Ill.

[22] Filed: Jan. 28, 1974

[21] Appl. No.: 437,110

[52] U.S. Cl.... 128/2.06 R; 128/419 PT; 307/247 R; 307/251; 307/267; 328/114; 328/151
[51] Int. Cl.² .......................................... A61B 5/04
[58] Field of Search..... 128/2.05 R, 2.06 A, 2.06 B, 128/2.06 R, 419 PT; 328/139, 114, 151; 307/267, 263, 238, 247 R, 251, 231, 239

[56] References Cited
UNITED STATES PATENTS

| | | | |
|---|---|---|---|
| 2,902,674 | 9/1959 | Billings et al. | 307/247 R |
| 3,513,833 | 5/1970 | Finch et al. | 128/2.06 R |
| 3,517,321 | 6/1970 | Weiss | 328/114 |
| 3,602,826 | 8/1971 | List et al. | 328/151 |
| 3,633,091 | 1/1972 | Bowers | 328/151 |
| 3,689,879 | 9/1972 | Burdick | 328/139 |
| 3,767,939 | 10/1973 | Chamran et al. | 307/251 |
| 3,769,965 | 11/1973 | Raddi | 128/419 P |
| 3,792,255 | 2/1974 | White | 328/151 |

*Primary Examiner*—William E. Kamm
*Attorney, Agent, or Firm*—Richard G. Kinney; Eugene M. Cummings

[57] ABSTRACT

A signal processing circuit for use in a digital memory-type EKG display system wherein analog EKG signals are periodically sampled and converted to a digital signal for processing and display comprises an amplitude hold circuit which maintains the instantaneous amplitude of pacemaker pulses contained in the analog EKG signal constant for a sufficient period of time to insure recognition of the pulses in the next sampling. Because no access is required to the sampling or conversion circuits of the system, the processing circuit can be readily added to an existing system.

20 Claims, 4 Drawing Figures

SIGNAL PROCESSING CIRCUIT

BACKGROUND OF THE INVENTION

The present invention is directed generally to data collection systems, and more particularly to a system for sampling analog EKG (Electrocardiograph) signals derived from one or more patients to form a single digital signal for processing and display at a central monitoring location.

In a hospital it is frequently necessary to monitor and analyze on a continuous basis the EKG signals from one or more patients. To this end, a memory-type data collection and display system, wherein the EKG signal from each patient is separately processed and displayed as a continuous trace showing the patients last several heartbeats over a predetermined preceding interval, is ordinarily provided at a continuously manned central monitoring location within the hospital. Such memory-type systems not only facilitate diagnosis by providing a steady trace which can be closely examined, but also may provide for continuous computer analysis of the EKG signals and for sounding an alarm in the event that the monitored function falls outside of a preset limit.

Typically, memory-type EKG display systems employ a digital memory wherein data from each patient is stored for subsequent analysis or CRT (cathode ray tube) read out. Data is entered into the memory by means of a sampling technique whereby the analog EKG output signal from each patient is periodically sampled to form a digital signal, the magnitude of which corresponds to the instantaneous level of the analog signal at the time of sampling. The digital signal is entered into an appropriate position in the memory for subsequent processing or display. One drawback of this sampling technique has been the possibility that a transient condition, such as the output pulse produced by an artificial heart stimulator, or pacemaker, may occur between successive samplings and therefore not be entered into storage and displayed by the system. The chance omission of such a pulse may prevent the operation of the pacemaker from being properly monitored, and may make it difficult for someone examining the EKG display to make an accurate diagnosis. This is especially true in the case of a demand pacemaker, i.e., a pacemaker which produces pulses only if the patient's heart does not contract. In this case the presence or absence of pulses is a ready indication of the condition of the heart. Consequently, erroneous omissions of pacemaker pulses in this case may mislead an observer.

One system for overcoming this problem is described and claimed in the prior patent of Thomas H. Burdick, one of the present applicants, U.S. Pat. No. 3,698,879, filed on May 18, 1971, and assigned to the present assignee. In this system the occurrence of a pacemaker pulse causes a predetermined counting state to be established in a register within the analog-to-digital converter of the EKG display system such that a digital signal having a predetermined magnitude is entered into the system memory during a predetermined number of successive cycles. Unfortunately, this system, while providing satisfactory performance, required access to and modification of the existing sampling and analog-to-digital converter circuitry of the system, and hence, could not be readily added to an existing system. Accordingly, the need has developed for a signal processing circuit which can be added to an existing EKG sampling-type data collection and display system without modification to the system.

SUMMARY OF THE INVENTION

The invention is directed, in a data collection system wherein an analog input signal is sampled at periodic spaced time intervals to develop a digital output signal, to a signal processing circuit for causing the data collection system to sample a transient pulse appearing in the analog input signal between the periodic samplings. The signal processing circuit comprises an analog-to-digital converter for converting the analog signal to a ditigal signal, pulse discrimination means for producing a control signal in response to the occurrence of the transient pulse, and means comprising an amplitude hold circuit responsive to the control signal for maintaining the instantaneous level of the analog input signal as applied to the analog-to-digital converter constant for a predetermined hold period following the occurrence of the transient pulse such that the amplitude of the pulse is sampled by the converter and converted to a corresponding digital output signal.

BRIEF DESCRIPTION OF THE DRAWINGS

The features of the present invention, which are believed to be novel, are set forth with particularity in the appended claims. The invention, together with the further advantages thereof, may best be understood by reference to the following description taken in connection with the accompanying drawings, in the several figures of which like reference numerals identify like elements, and in which:

DESCRIPTION OF THE PREFERRED EMBODIMENT

Although it will appreciated that the present invention can be constructed in various forms for use in conjunction with various types of data collection systems, the invention finds particular utility in connection with a system for processing and dispalying EKG data from multiple patient sources at a central monitoring point, and therefore will be shown in that context.

Figure 1:
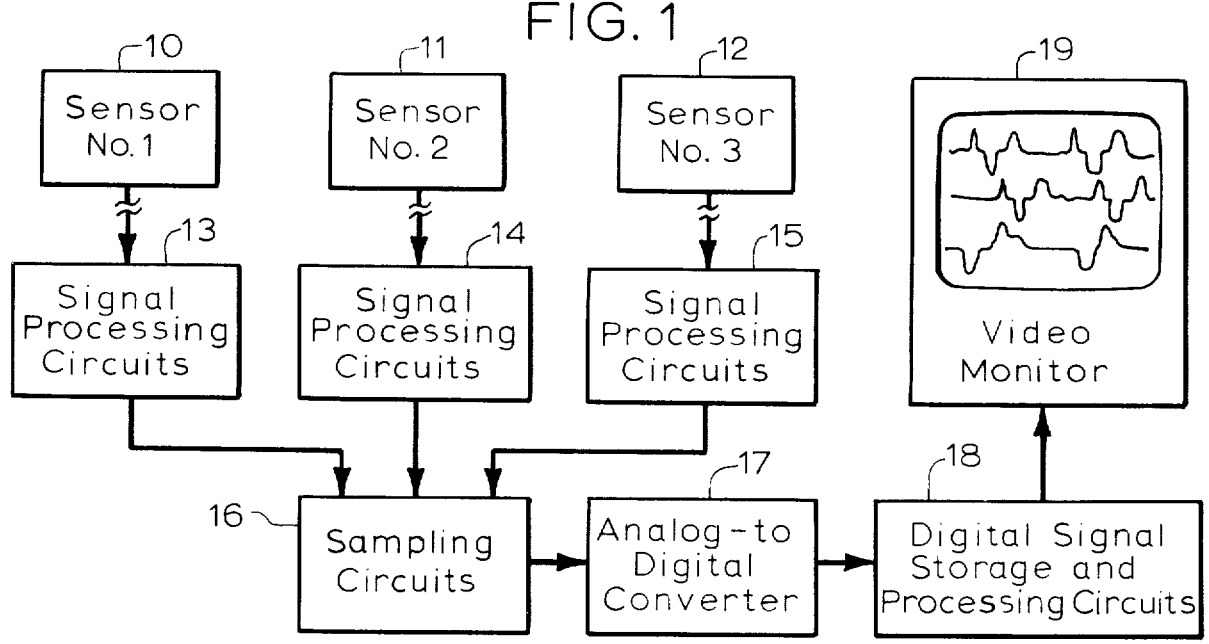
FIG. 1 is a functional block diagram showing a sampling-type EKG data collection and display system incorporating the present invention.

Referring now to the figures in greater detail, and in particular to FIG. 1, a data collection system for collecting EKG data from three different patients and displaying this data at a central location is seen to comprise three EKG sensors 10, 11, and 12 associated with respective ones of the three patients. The output of each sensor, comprising an analog signal having an amplitude corresponding to the heart activity of the patient, is applied to respective ones of three signal processing circuits 13, 14 and 15. As will be seen presently, it is the function of these signal processing circuits to amplify the analog output signal, and, in the case of a pacemaker-equipped patient, to assure detection of the pacemaker output signal at the central monitoring point.

The outputs of signal processing circuits 13–15 are applied to a sampling circuit 16, wherein appropriate circuitry is provided for periodically sampling the amplitude of each of the applied analog signals to develop a composite analog signal. The composite signal is applied to an analog-to-digital converter 17 wherein it is converted to a digital signal having a magnitude representative of the instantaneous level of the particular analog signal then being sampled. The digital signal from converter 17 is applied to digital signal storage and processing circuits 18 wherein appropriate circuitry is provided for commutating the digital information from the three patients into separate memory sections and for developing appropriate output signals for application to the system display unit, video monitor 19. By reason of the storage capability provided by the digital storage and processing circuits 18, the EKG waveforms of the three patients are simultaneously displayed on a continuous basis, for a predetermined preceding time interval covering several heartbeats, one-above-the-other on monitor 19. It will be appreciated that three separate display units could be used instead, and that instead of a video-tape display unit it would be possible to utilize a chart recorder or other type of visual output device. Furthermore, it will be appreciated that storage and processing circuits 18 may contain appropriate circuitry for automatically monitoring the EKG waveforms and sounding an alarm should the signals from any one patient become abnormal or non-existent.

Figure 2:
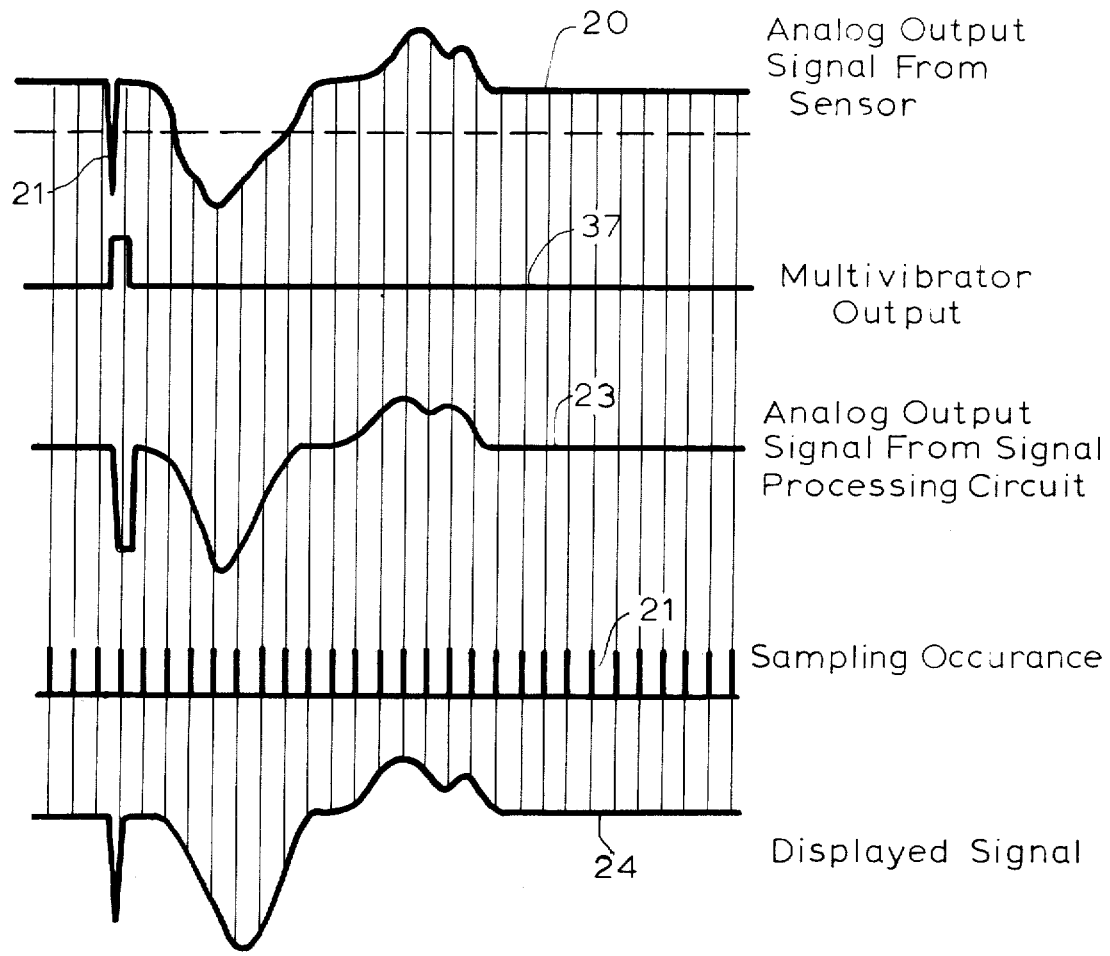
FIG. 2 is a presentation of certain waveforms useful in understanding the operation of the signal processing circuit of the present invention.

In accordance with the present invention, to insure that the system of FIG. 1 will display the operation of a pacemaker, signal processing circuits 13–15 have been provided in association with each of sensors 10–12 to modify the analog output signal from their respective sensors in the event of a pacemaker pulse. The need for such modification of the output signal is illustrated in FIG. 2, wherein a typical EKG waveform 20 for a pacemaker-equipped patient is sampled at periodic intervals, as indicated by a sampling occurrence waveform 21. Waveform 20 includes a sharp negative-polarity pacemaker pulse 22 which, in this instance, occurs between successive samplings of the analog signal. Since the pacemaker pulse is not sampled by sampling circuits 16, it is not converted to a digital signal by converter 17, and therefore, does not appear on video display unit 19.

To insure that all such pulses will be displayed, the invention effectively stretches or extends pacemaker pulses by means of novel circuitry provided in signal processing circuits 13–15. This is illustrated by waveform 23, which shows a widened pacemaker pulse in the analog output signal from the signal processing circuits. It will be noted that the pulse has been widened just sufficiently to appear on the next successive sampling of the analog signal. Now, when the analog output signal 23 is subsequently sampled by sampling circuits 16, the digital output signal developed by converter 17 necessarily includes a component representative of the pulse, and the pulse is reproduced in the signal subsequently displayed at the central monitoring location, as shown by waveform 24.

Figure 3:
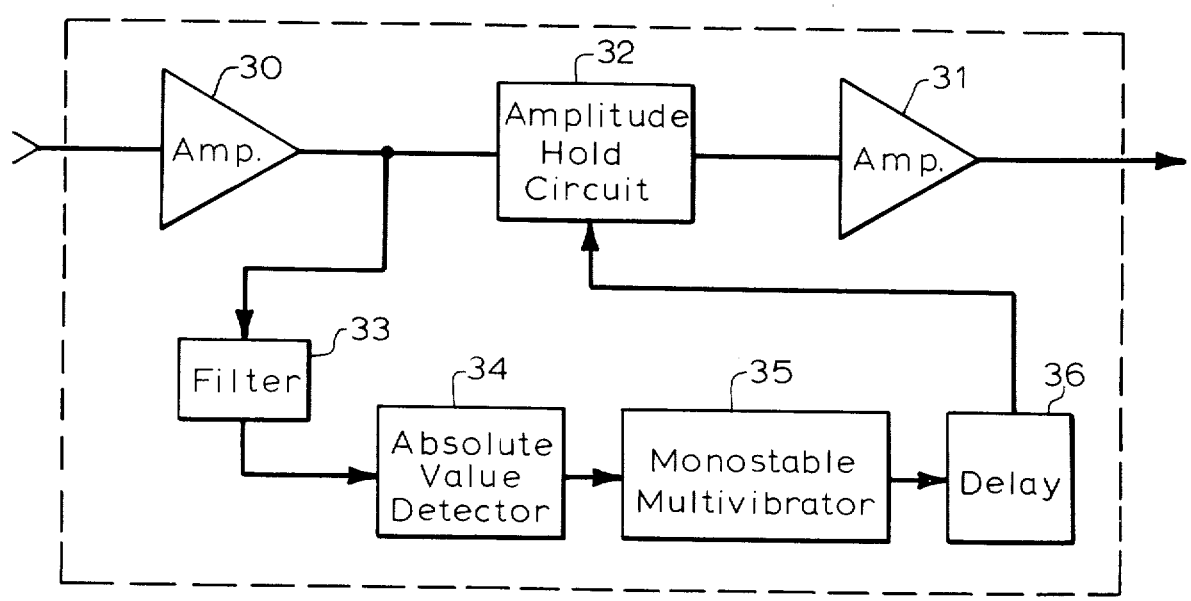
FIG. 3 is a functional block diagram of a signal processing circuit constructed in accordance with the present invention.

Referring to FIG. 3, the signal processing circuits 13–15 are each seen to include a pair of amplifiers 30 and 31 for amplifying the analog output signal from sensor 10. The output of amplifier 30 is connected by a normally-closed amplitude hold circuit 32 to the input of amplifier 31. Since in normal operation amplitude hold circuit 32 is closed, the signal developed by amplifier 30 is normally applied directly to amplifier 31 such that two successive amplifications of the developed signal are obtained.

To detect the occurrence of the pacemaker pulse signal processing circuits 13–15 are each provided with a pulse recognition filter 33 connected to the output of amplifier 30. This filter, which may comprise a differentiating network, recognizes and passes only transient-type signals, i.e., those with a steep rise time. The output of filter 33, which may be of either negative or positive polarity, depending on the polarity of the signal produced by the pacemaker, is applied to an absolute value detector 34. It is the function of this detector to produce an output signal of known polarity each time a transient pulse is detected by filter 33. This output signal is applied to a monostable multivibrator 35, which is triggered to an on state upon receipt of the signal to produce a rectangular control pulse. The rectangular control pulse is applied to a delay circuit 36, wherein it is delayed for a predetermined period of time prior to application to amplitude hold circuit 32. This enables amplitude hold circuit 32 to receive and store substantially the peak voltage level of the pulse prior to being conditioned to a holding state.

Amplitude hold circuit 32, which we have seen is normally closed so as to freely pass signals from amplifier 30 to amplifier 31, is conditioned open by the delayed control pulse from delay network 36 to maintain at its output, and hence at the input of amplifier 31, a constant potential equal to the instantaneous potential of the most recently received signal from sensor 10 as amplified by amplifier 30. This condition continues until the control pulse developed by multivibrator 35 is terminated.

Returning to FIG. 2 and waveform 37 therein, it is seen that the width of the control pulse developed by multivibrator 35 is sufficient to span at least one interval between successive samplings. Since for the duration of this control pulse amplitude hold network 32 is conditioned open to maintain the then existing voltage level at the input of amplifier 31, this width is sufficient to insure that the pacemaker pulse will be sampled. As a result, the signal displayed at video display unit 19, as shown by waveform 24, contains from reconversion of the composite digital signal a pulse closely representative of the pulse actually developed by the pacemaker.

Figure 4:
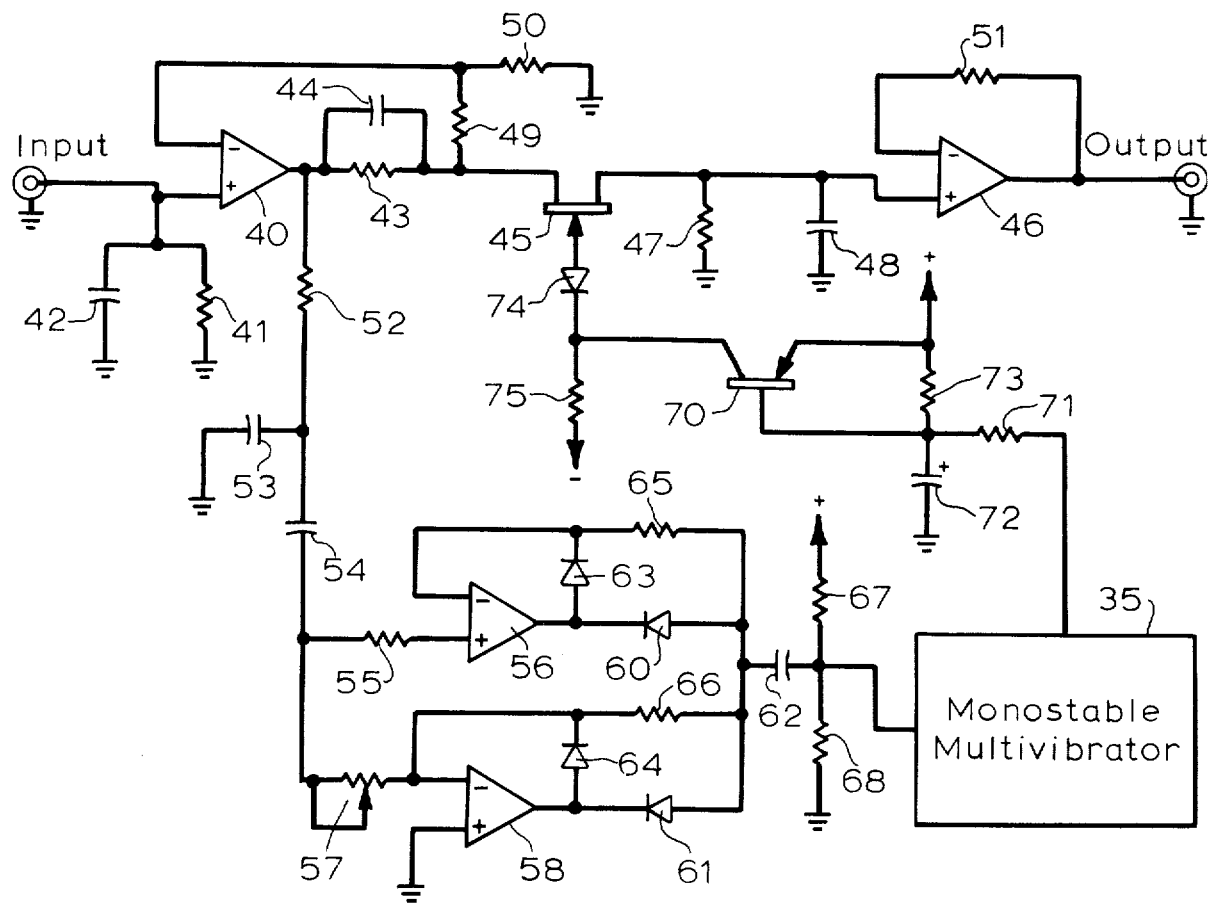
FIG. 4 is a simplified schematic diagram of a signal processing circuit constructed in accordance with the present invention.

Referring to FIG. 4, a simplified schematic diagram is shown for the signal processing circuits 13–15 shown functually in FIG. 3. The unprocessed analog signal from the associated one of EKG sensors 10–12 is applied to the non-inverting input of a first operational amplifier 40. A resistor 41 is connected from this terminal to ground to provide a proper input load impedance and a capacitor 42 is similarly connected to bypass extraneous noise on the input signal to ground. After amplification by amplifier 40, the applied analog signal is coupled by the parallel combination of a resistor 43 and a capacitor 44 to one main electrode of field effect transistor (FET) 45. The other main electrode of FET 45 is coupled to the non-inverting input of a second operational amplifier 46, and to ground by the parallel combination of a resistor 47 and a capacitor 48. FET 45 and capacitor 48 comprise the principal elements of an amplitude hold circuit, the operation of which will be explained presently.

A pair of resistors 49 and 50 are connected from the first main electrode of FET 45 to ground, and the juncture of these resistors is connected to the inverting input of the first operational amplifier 40. These resistors, together with resistor 43, form a voltage divider network which supplies a portion of the amplifier output signal of amplifier 40 back to the inverting input of that device for gain stabilization purposes.

FET 45 functions as a series switch between operational amplifiers 40 and 46 to control the application of the amplified analog signal from amplifier 40 to amplifier 46. When FET 45 is biased into saturation, corresponding to the closed state of amplitude hold citcuit 32, the signal applied to amplifier 46 corresponds to the output signal of amplifier 40. However, when FET 45 is biased into cut-off, corresponding to the open or hold state of amplitude hold circuit 32, the signal applied to amplifier 46 is that appearing across capacitor 48, and not necessarily that at the output of amplifier 40. When FET 45 is saturated the voltage across capacitor 48 follows the output signal of amplifier 40. However, when FET 45 is cut-off the input impedance of amplifier 46 and the impedance of resistor 47 are sufficiently high to cause the instantaneous voltage level of the signal applied to capacitor 48 at the time FET 45 was cut off to be maintained across the capacitor. In this manner capacitor 48 and FET 45 comprise a controllable amplitude hold circuit which may be conditioned to hold the level of an applied analog signal at the input of amplifier 46.

Resistor 47 provides a current path between the non-inverting input of amplifier 46 and ground, regardless of the conduction state of FET 45. This is necessary for proper operation of amplifier 46. Resistor 43 serves to limit the initial charging current to capacitor 48, and capacitor 44 provides frequency compensation at the output of operational amplifier 40. A resistor 51 is connected between the output of amplifier 46 and the non-inverting input of that device to provide gain stabilization.

The amplified analog signal appearing at the output of the first operational amplifier 40 is also coupled by a resistor 52 to the juncture of a pair of capacitors 53 and 54. The remaining terminal of capacitor 53 is connected to ground and the remaining terminal of capacitor 54 is connected by a resistor 55 to the non-inverting input of an operational amplifier 56, and by variable resistor 57 to the inverting input of an operational amplifier 58. Resistor 52 and capacitor 53 together form a low-pass filter for attenuating extraneous high-frequency signals, such as noise or hash, which may be contained on the applied analog signal. Capacitor 54 and resistor 55 together form a first high-pass filter which prevents the application of non-pulse signals, such as those associated with a normal heartbeat, from being applied to operational amplifier 56. Capacitor 54 and variable resistor 57 together form a second high-pass filter to perform the same function with respect to operational amplifier 58. It will be appreciated that capacitors 53 and 54 and resistors 52, 55 and 57 together form a band pass filter which passes only pulse signals such as those formed by a pacemaker. Thus, only pacemaker-induced pulses are applied to operational amplifiers 56 and 58.

Operational amplifiers 56 and 58 comprise principal elements of an absolute value detector for producing an output signal of known polarity upon the occurrence of an applied input pulse of either polarity. To this end, the output of amplifier 56 is connected to the cathode of a diode 60, and the output of amplifier 58 is connected to the cathode of a diode 61. The anodes of diodes 60 and 61 are connected to one terminal of a capacitor 62. The output of operational amplifier 56 is also connected to the anode of a diode 63, the cathode of which is connected to the inverting input of that amplifier. The output of operational amplifier 58 is also connected to the anode of a diode 64, the cathode of which is connected to the inverting input of that amplifier. The juncture of diodes 60 and 61 and capacitor 62 is connected by resistors 65 and 66 to the inverting inputs of respective ones of operational amplifiers 56 and 58. These resistors provide gain-stabilizing degenerative feedback for the respective amplifiers.

In operation, the application of a negative-polarity pacemaker pulse to amplifier 56 causes a negative-polarity output pulse therefrom which is coupled by diode 60 to capacitor 62. The application of a positive polarity pulse to this amplifier causes a positive-polarity output pulse which, although blocked by diode 60, is coupled by diode 63 back to the inverting input of the amplifier to oppose the positive-polarity pulse applied to the non-inverting input. Conversely, the application of a positive-polarity pulse to the inverting input of amplifier 58 causes a negative-polarity output pulse therefrom to be applied to capacitor 62. The application of a negative-polarity pulse to amplifier 58 causes a positive-polarity pulse therefrom to be applied back to the inverting input, opposing any further output from that amplifier. Thus, an absolute-value detector is formed which develops a negative polarity output pulse regardless of the polarity of the applied pacemaker pulse. Variable resistor 57 can be adjusted to balance the sensitivities of the two operational amplifiers for optimum performance.

The remaining terminal of capacitor 62 is connected to the triggering input of monostable multivibrator 35, which operates as previously described in connection with FIG. 3 and which may be entirely conventional in design and construction, appropriate circuit elements being selected to provide a desired pulse duration of at least one sampling interval. The input to multivibrator 35 is also connected by a resistor 67 to a positive-polarity unidirectional current source and by a resistor 68 to ground. This network serves as a bias network to develop a proper direct current bias level at the input of multivibrator 35.

The output of multivibrator 35 is connected to the base of a PNP transistor 70 through a delay network comprising a resistor 71 serially connected between the multivibrator and the base, and a capacitor 72 connected from the base to ground. This network delays the effect of the control pulse on transistor 70 for a predetermined time period dependent on the relative values of resistor 71 and capacitor 72. A bias resistor 73 is connected from the juncture of resistor 71 and capacitor 72 to the emitter of transistor 70, which in turn is connected to a source of positive-polarity unidirectional current. The collector of transistor 70 is connected to the gate of FET 45 by a diode 74, and to a source of negative-polarity unidirectional current by a resistor 75.

Upon occurrence of an output pulse from multivibrator 35, capacitor 72, initially uncharged, charges through resistor 71. When capacitor 72 becomes sufficiently charged such that the voltage across its terminals, and hence the voltage applied to the base of transistor 70, becomes sufficient to terminate conduction in the transistor, FET 45 is biased into cut-off by the negative bias applied its gate resistor 75. This terminates conduction through the main electrodes of the FET and conditions the amplitude hold circuit to an open or holding state. The holding state continues until the output pulse from multivibrator 35 ends, at which time capacitor 72 discharges and the base of transistor 70 again becomes sufficiently negative to cause the transistor to conduct. This has the effect of biasing the gate of FET 45 positive, conditioning the FET into saturation and the amplitude hold circuit closed. Diode 74 prevents current flow through the gate into the main electrodes of the FET.

While a preferred circuit has been shown, it will be appreciated that various other types of circuits can be employed for the same purpose. For example, it would be possible to employ another type of absolute value detector in place of the parallel-connected differential amplifiers 56 and 58. Also, it would be possible to utilize an RS-type multivibrator instead of a monostable multivibrator by utilizing pulses from the output of the absolute value detector as set pulses and pulses from the sampling circuit obtained upon completion of the next subsequent sampling of the particular analog signal as reset pulses. This, of course, would have the disadvantage of requiring access to the internal circuitry of the sampling circuit.

It will also be appreciated that the absolute value detector, the monostable multivibrator, and the delay network, while shown in a specific arrangement in FIG. 3, could be arranged in a different order. For instance, it would be possible to apply the output of the absolute value detector to delay network 36, and the delayed pulse therefrom to monostable multivibrator 35. It would then not be necessary to delay the output of multivibrator 35 prior to application to the amplitude hold circuit 32.

It will be appreciated that the relative amplitudes of the EKG signal and the detected pulse can be adjusted by proportioning resistor 52 and resistors 43, 49 and 50. In practice, the ratio of these resistors is selected such that the gain of the pulse as derived from amplifier 30 is approximately three times that of the signal applied to amplifier 31. In practice amplifier 31 may be a unity gain device, as for instance an emitter-follower, with suitable output circuitry for interfacing with the system sampling circuits.

In practice, in a standard system providing a ten second display with 200 samples per second for each patient, a practical bandwidth for filter 33 has been found to be 50–2,000 KHz. Under these conditions, a 5 millisecond sampling period exists, and it has been found that a control pulse duration of 6 milliseconds provides good results.

Thus, a novel signal processing circuit has been shown and described which detects pacemaker pulses and artificially stretches these pulses for a sufficient period of time to insure that they will be detected and displayed in a sampling-type digital display system. Since the signal processing circuit of the invention requires no internal connection to the sampling or analog-to-digital conversion circuitry of the data collection and display system, it can be readily added to an existing system without modification thereto.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A signal processing circuit for use in conjunction with a data collection system wherein an analog input signal is sampled at periodic spaced time intervals and applied to an analog-to-digital converter to develop a digital output signal for causing said system to respond to a transient pulse appearing in said analog input signal between said periodic samplings, said signal processing circuit comprising, in combination:

pulse discrimination means for producing a control signal in response to the occurrence of said transient pulse; and means including an amplitude hold circuit responsive to said control signal for maintaining the instantaneous level of said analog input signal as applied to said analog-to-digital converter constant for a predetermined hold period following the occurrence of said transient pulse such that the amplitude of said pulse is sampled by said converter and converted to a corresponding digital output signal.

2. A signal processing circuit as defined in claim 1 wherein said predetermined hold period is substantially equal to the sampling period of said data collection system.

3. A signal processing circuit as defined in claim 1 which further comprises a multivibrator responsive to said control signal for conditioning said amplitude hold circuit operative for said predetermined period of time.

4. A signal processing circuit as defined in claim 1 which further comprises means for delaying the operation of said amplitude hold circuit for a predetermined period of time following recognition of said transient pulse by said pulse recognition means to cause substantially the peak amplitude of said pulse to be held by said amplitude hold circuit for subsequent sampling by said analog-to-digital converter.

5. A signal processing circuit as defined in claim 3 wherein said transient pulse recognition means include a filter circuit for passing only transient pulses, and an absolute-value detector circuit responsive to the transient pulses passed by said filter circuit for producing a control signal for application to said multivibrator, the polarity of said control signal being independent of the polarity of said transient pulses.

6. A signal processing circuit as defined in claim 1 wherein said analog input signal comprises an EKG signal and said transient pulses comprise pacemaker pulses superimposed thereon.

7. A signal processing circuit for use in conjunction with a data collection system wherein an anlog input signal is sampled at periodic spaced intervals and applied to an analog-to-digital converter to develop a digital output signal for causing said system to respond to a transient pulse appearing in said analog input signal between said periodic samplings, said signal processing circuit comprising, in combination:

means including a filter circuit for passing only transient pulses in said analog signal;

means including an absolute-value detector circuit responsive to the transient pulses passed by said filter circuit for producing a control signal; the polarity of said control signal being independent of the polarity of said transient pulses;

means including a multivibrator responsive to said control signal for producing a control pulse of predetermined duration following the occurrence of said transient pulse; and means including an amplitude hold circuit responsive to said control pulse for maintaining the instantaneous level of said analog input signal as applied to said analog-to-digital converter constant for the duration of said pulse, thereby causing said data collection system to sample said transient pulse.

8. A signal processing circuit as defined in claim 7 wherein said hold period corresponds substantially to the period between successive samplings of said analog input signal by said data collection system.

9. A signal processing circuit as defined in claim 7 which further comprises means for delaying the operation of said amplitude hold circuit for a predetermined period of time such that substantially the peak amplitude of said transient pulse is maintained by said amplitude hold circuit.

10. A signal processing circuit as defined in claim 7 wherein said analog input signal comprises an EKG signal and said transient pulses comprise pacemaker pulses superimposed thereon.

11. A signal processing unit comprising, in combination;

signal input means for receiving an input signal;

signal output means from which a processed output signal may be taken;

processing means coupled between said input and said output and including means for detecting the presence in a received signal of narrow pulses, and means, responsive to said detecting means detection of a narrow pulse, for holding and reproducing the narrow pulse, so as to deliver an expanded pulse to said output means but otherwise delivering substantially the input signal thereto.

12. A sampling-type EKG data collection and display system, comprising:

a plurality of sensors (10, 11) for developing EKG electrical signals;

a signal processing unit (13, 14) as defined in claim 11 for each of said plurality of sensors for coupling to receive an EKG signal therefrom at its said signal input;

means (16–18) for coupling periodically the output signals from said output of each of said processing units and for reproducing said EKG signals from said sampled signals, said sampling rate and duration of each sample being related to the expanded pulse width delivered by said processing units so as to insure reproduction of pulses detected thereby.

13. A data collection system for sampling an analog input signal at periodic intervals to develop a digital output signal, said system comprising, in combination:

an analog-to-digital converter for converting said analog input signal to said digital output signal;

pulse discrimination means for producing a control signal in response to the occurrence of said transient pulse; and means including an amplitude hold circuit responsive to said control signal for maintaining the insntantaneous level of said analog input signal as applied to said analog-to-digital converter constant for a predetermined hold period following the occurrence of said transient pulse such that the amplitude of said pulse is sampled by said converter and converted to a corresponding digital output signal.

14. A data collection system as defined in claim 13 wherein said predetermined hold period is substantially equal to the sampling period of said data collection system.

15. A data collection system as defined in claim 13 which further comprises means for delaying the operation of said amplitude hold circuit for a predetermined period of time following recognition of said transient pulse by said pulse recognition means to cause substantially the peak amplitude of said pulse to be held by said amplitude hold circuit for subsequent sampling by said analog-to-digital converter.

16. A data collection system as defined in claim 13 wherein said analog input signal comprises an EKG signal and said transient pulses comprise pacemaker pulses superimposed thereon.

17. A data collection system for sampling an analog input signal at periodic intervals to develop a digital output signal, said system comprising in combination:

an analog-to-digital converter for converting said analog input signal to said digital output signal;

means including a filter circuit for passing only transient pulses in said analog signal;

means including an absolute-value detector circuit responsive to the transient pulses passed by said filter circuit for producing a control signal; the polarity of said control signal being independent of the polarity of said transient pulses;

means including a multivibrator responsive to said control signal for producing a control pulse of predetermined duration following the occurrence of said transient pulse; and means including an amplitude hold circuit responsive to said control pulse for maintaining the instantaneous level of said analog input signal as applied to said analog-to-digital converter constant for the duration of said pulse, thereby causing said data collection system to sample said transient pulse.

18. A data collection system as defined in claim 17 wherein the duration of said pulse substantially corresponds to the period between successive samplings of said analog input signal by said data collection system.

19. A data collection system as defined in claim 17 which further comprises means for delaying the operation of said amplitude hold circuit for a predetermined period of time such that substantially the peak amplitude of said transient pulse is maintained by said amplitude hold circuit.

20. A data collection system as defined in claim 17 wherein said analog input signal comprises an EKG signal and said transient pulses comprise pacemaker pulses superimposed thereon.

* * * * *